United States Patent Office
3,092,632
Patented June 4, 1963

3,092,632
PROCESS FOR PREPARING ADENINES
Kenneth D. Zwahlen, Modesto, Calif., assignor to Shell Oil Company, New York, N.Y., a corporation of Delaware
No Drawing. Filed Mar. 31, 1960, Ser. No. 18,821
5 Claims. (Cl. 260—252)

This invention relates to a process for the preparation of adenines containing at least one organic group bonded to the exocyclic nitrogen atom.

The process provided by this invention comprises reacting a salt of an adenine compound wherein at least one hydrogen atom is bonded to the exocyclic nitrogen atom with an alcohol in the presence of a strong base, the reaction proceeding according to the equation:

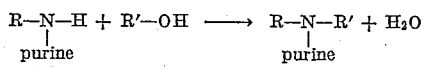

wherein R is hydrogen or an organic radical as described hereinafter, R'—OH is the alcohol and "purine" stands for the tautomeric forms of the purine structure bonded to the indicated nitrogen atom via the carbon atom in the 6-position of the purine structure.

Described in more detail, the new process comprises heating together a salt of an adenine compound wherein at least one hydrogen atom is bonded to the exocyclic nitrogen atom and an alcohol in the presence of a strong base at a temperature of at least about 150° C., thereafter recovering the product which is the adenine compound having bonded to the exocyclic nitrogen atom thereof the organic radical of the alcohol.

The suitable adenine compounds are those wherein the exocyclic nitrogen is bonded to at least one hydrogen atom. These adenines can be described by the formulae:

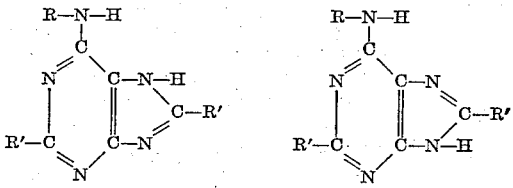

wherein R is hydrogen, or essentially aliphatic hydrocarbon and R' is hydrogen, inorganic or organic.

It is necessary to describe these compounds by means of two formulae because the adenines which may be considered to be, and in some cases may actually be, the progenitors have two tautomeric forms, as follows:

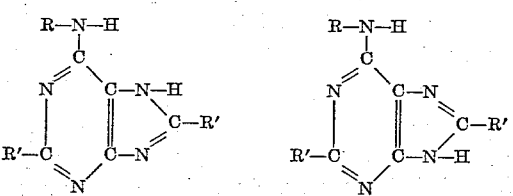

The two series of compounds are equivalent with respect to their utility as the starting materials in the process of this invention.

The radical R can be essentially aliphatic hydrocarbon, by which is meant that it is aliphatic hydrocarbon or aliphatic hydrocarbon substituted by one or more non-hydrocarbon substituents which are unreactive under the conditions used in the process of this invention. Suitable substituents thus include the halogens, the nitro radical, lower alkoxy radicals, lower alkylthio radicals, the hydroxy radical, and the like. The meaning of the term aliphatic will be discussed in more detail in the description of the radical R', since the radical R can be an aliphatic hydrocarbon radical or substituted aliphatic hydrocarbon radical such as is represented by R'.

The radical R' suitably can be inorganic—that is to say, it can be a radical such as the hydroxy radical, a mercapto radical, or other inorganic radical which is substantially inert under the conditions employed in the process of the invention.

The radical R' suitably can be organic, and suitably can be cyclic or aliphatic in configuration. Thus, it can be cycloaliphatic, aromatic or heterocyclic, including both unsubstituted and substituted cycloaliphatic, aromatic and heterocyclic.

It can, therefore, be a radical such as the cyclohexyl radical, the phenyl radical, the lower alkyl-substituted phenyl radicals, or such radicals substituted by one or more non-hydrocarbon substituents, or it can be a hetero radical such as a furfuryl radical, a pyran radical or the like. Preferably, however, because of the utility of the compounds derived therefrom, the radical R' is aliphatic. The term "aliphatic" is here intended to have its usual meaning: that is, an aliphatic radical is one which is essentially chain-like in configuration, as opposed to cyclic configuration. The aliphatic radicals represented by R' thus can be aliphatic hydrocarbon, they can be sustituted aliphatic hydrocarbon, or they can be hetero aliphatic radicals, with atoms other than carbon in the essential chain, provided that their basic configuration is chain-like and not cyclic. Where the aliphatic radical is hetero, the atom joining the radical to the carbon atom of the adenine structure can be carbon, or it can be an atom other than carbon. The group R and R' thus can be an aliphatic hydrocarbon radical, such as an alkyl radical, an alkenyl radical, an alkadienyl radical, or the like, and that radical can be of either straight-chain or branched-chain configuration. Likewise, the radicals R and R' can be substituted by one or more non-hydrocarbon substituents. The radical R' can also be hetero, such as an alkylthio radical, an alkyloxy radical, an alkyloxyalkyl radical, an alkylthioalkyl radical, or the like. Where the group R' contains one or more non-hydrocarbon substituent groups, the preferred substituents are the halogen atoms, the cyano radical, the nitro radical, the hydroxyl radical, the mercapto radical, and the like. The compounds prepared from the adenines substituted by these radicals which are of marked interest are those wherein the substituent radical or radicals are low molecular weight. Consequently, it is preferred that each radical represented by R and R' contain not more than ten carbon atoms, while those wherein each radical R and R' contains from 1 to 6 carbon atoms are of more interest. A preferred subgroup of these adenines are those wherein the radical, R, bonded to the exocyclic nitrogen (N⁶—) atom is hydrogen.

The products prepared by the process of this invention which are of greatest interest—for use in preserving plant materials—are those which are derived from certain subgenera of these adenine compounds. These subgenera are: (a) that wherein R and R' in all instances represent hydrogen; (b) that wherein R in both cases represents hydrogen and the radical R' bonded to the carbon atom in the 8-position of the adenine ring is lower alkyl, preferably methyl or ethyl.

Examples of suitable adenines which can be employed as starting materials include adenine itself, N⁶-methyladenine, 2-methyladenine, 8-propyladenine, 2-propyl-8-methyladenine, 8-methyladenine, 8-ethyladenine, 2-methylthioadenine, 2-hydroxyadenine, and the like.

The adenines unsubstituted on the rings are known compounds which occur naturally and which have been synthesized by reaction of amines with 6-halopurines and by reaction of amines with 6-alkylthiopurines. Adenines substituted at the 2-position are readily prepared by reacting an alkali metal salt of the adenine with a halide of the desired substituent. Adenines substituted at the 2-position are readily prepared by reacting the appropriately 2-substituted 4,5,6-triaminopyridine with an acid or acid anhydride. Reaction of a 4,5,6-triaminopyridine with an appropriate acid or acid anhydride likewise prepares the desired 8-substituted adenine.

In the new process, the adenine compound is used in the form of its salt with a base. As will be shown later herein, the salt per se may be used as the starting material, or the adenine may be used as the starting material and the salt formed in situ in the reaction mixture. While the adenine salt of any base may be used, as will also be shown hereinafter, it is preferred that the salt be the salt of the base used as catalyst in the process of the invention.

The suitable alcohol is one which is stable at the temperatures employed in the new process—that is, at temperatures of from about 150° C. to about 350° C. The alcohol thus can be an alkyl alcohol, either branched-chain or straight-chain in configuration, and unsubstituted or substituted by one or more substituents such as hydroxy, amino ($—NH_2$), including mono- and dialkylamino, nitro, or the like. The alcohol can be an aralkyl alcohol, such as benzyl alcohol, phenethyl alcohol, the isomeric lower alkyl-substituted phenylalkyl alcohols, and including such substituted aralkyl alcohols as the isomeric lower alkyloxy-substituted benzyl alcohols, the isomeric mono- and polyhalobenzyl alcohols, mono- and polynitrobenzyl alcohols and the like. The aromatic alcohols, such as phenol, anthrol, naphthol, and like, also are suitable, as are such alcohols containing substituent groups, of both hydrocarbon and non-hydrocarbon character. The preferred alcohols are the primary alcohols of up to 10 carbon atoms. Because of the utility of the products formed therefrom in the process of this invention, the most desirable alcohols are the aralkyl alcohols of up to 10 carbon atoms wherein the alkyl group is not substituted by any non-hydrocarbon substituent, benzyl alcohol being the most important of this group.

The reaction of the alcohol and the adenine compound is conducted by heating a mixture of the alcohol and a salt of the adenine compound in liquid phase to a temperature above about 150° C. in the presence of a catalytic amount of a strong base. Because most adenine compounds tend to decompose at temperatures above about 350° C., temperatures above about 325° C. preferably are avoided. In most cases, temperatures above about 300° C. show little advantage over temperatures of 300° C. or less. In most cases, a temperature of about 225° C.—that is, from about 180° C. to about 250° C.—will be found most advantageous as providing optimum extent of the reaction at reasonable reaction rates and substantially complete avoidance of any decomposition of reactants or products.

The reaction is catalyzed by a strong base, by which is meant a base having an ionization constant near unity. The most common strong bases are, of course, the alkali metal hydroxides, alkali metal oxides, quaternary ammonium bases and alkali metal alkoxides. Of these, the most convenient for use in the new process are the alkali metal hydroxides, sodium and potassium hydroxides being preferred because of their ready availability at low cost.

At least about about 0.05 mole of the base is required per mole of the adenine salt. But little additional value accrues through the use of more than about 0.50 mole of the base per mole of the salt, although greater amounts of base can be tolerated in the mixture without significant adverse effect. In most cases, from about 0.10 to about 0.25 mole of base per mole of salt will be found most advantageous.

As has already been pointed out, it is advantageous that the adenine salt used be the salt of the base used, since this minimizes the number of different materials present in the reaction mixture. Thus, a salt of the adenine and the base, as such, can be used, or the salt can be formed in situ by reaction of the adenine itself with the base in the reaction mixture. In such a case, sufficient base is used to form the salt and provide the necessary concentration of free base. It is to be noted that many of the adenine salts dissociate to some extent, so that it will not be necessary in all cases to provide a mole of base to form the salt of the adenine and additional base to provide free base. Likewise, in some cases it will be found that the salt of the adenine when added to the reaction mixture will provide a sufficient amount of free base. In any particular case, whether or not base must be added when the salt per se is used will be readily ascertainable, of course, by following the course of the reaction. Since amounts of free base in excess of that required for the purpose of forming the salt and providing the free base can be tolerated, it is usually best to insure that the reaction will go forward under optimum conditions by adding the requisite amount of free base even when the salt per se is used. Thus, in the case of the reaction of benzyl alcohol with adenine, the reaction went forward to give an 85% yield when 0.96 mole of sodium hydroxide was added per mole of the adenine. As a general rule, it is desirable to provide at least 0.90 mole of base per mole of the adenine and ordinarily it will be found advantageous to add from 1.0 to about 1.25 moles of base per mole of the adenine. Where the adenine salt is used, it will be found advantageous to add from about 0.05 to about 0.25 mole of base per mole of the salt.

The duration of the reaction in general is not critical, but preferably the shortest reaction time commensurate with complete reaction should be used. At the preferred reaction temperatures—i.e., 180–250° C.—the necessary reaction times will range from about one-third to one-half hour at the higher temperatures, to several hours at the lower temperatures.

The reaction should be carried out in liquid phase. It is not necessary that a solvent be present, although this may be found to be desirable where a low-boiling alcohol is used and it is desired to avoid use of the higher pressures required to maintain the alcohol in the liquid phase. Suitable solvents include the dialkyl ethers of polyalkyleneglycols, such as the dimethyl ether of diethyleneglycol, higher dialkyl acetals, such as dibutyl acetal, and esters such as bis-(2-ethylhexyl)sebacate, pentaerythritol tetracaproate. If it is desired to avoid the use of such a solvent, then a pressure sufficient to maintain the alcohol in liquid phase may be used. For example, a pressure of up to about 80 atmospheres would be required to maintain methanol as a liquid at temperatures up to about 250° C. Higher boiling alcohols of course would require correspondingly lower pressures to maintain them in liquid phase at the reaction temperatures. Where an alcohol, such as benzyl alcohol, which boils in the range of desired reaction temperatures, is used, it is generally most convenient to conduct the reaction under reflux conditions, distilling the water formed in the reaction from the reaction mixture at about the rate that it is formed, it being generally desirable to remove the water of reaction as it is formed.

At least the stoichiometric amount of the alcohol should be used—i.e., at least one mole per mole of the adenine compound. Generally, it is desirable to employ a substantial excess of the alcohol, the excess being employed both to drive the reaction to completion, and to provide a readily fluid reaction medium. For example a 5- to 10-fold excess of the alcohol may be used in such a case.

The product adenine compound ordinarily is recovered by adding water to the cooled reaction mixture, extracting the mixture with a solvent to remove the excess alcohol, then precipitating the adenine compound from the aqueous solution of salt by neutralizing the solution with an acid such as acetic acid.

In one experiment exemplifying the process of the present invention one mole of adenine and 1.1 moles of base were stirred in more than four moles of benzyl alcohol and the mixture heated to reflux with vigorous stirring. Water formed first from the reaction between the adenine and the base and then from the reaction of the metal derivative of adenine with the benzyl alcohol. When the reaction was completed two moles of water had been collected and removed by distillation. The mixture was then cooled and water added. The excess benzyl alcohol was removed by extracting with an organic solvent. The benzyladenine precipitated from the basic aqueous phase upon neutralizing with acetic acid. The product was filtered, washed with water and dried. The results of several experiments in which different factors were varied are given in the following table.

*Base-Catalyzed Reaction of Adenine and Benzyl Alcohol at Reflux*

| Adenine (grams) | Base | | Moles Base/ Moles Adenine | Benzyl Alcohol (ml.) | Time (hours) | Water Collected (ml.) | Yield of N⁶-Benzyladenine | |
|---|---|---|---|---|---|---|---|---|
| | Kind | Grams | | | | | Grams | Percent |
| 13.4 | KOH | 7 | 1.1 | 30 | 20 | 2.5 | 13.5 | 60 |
| 7 | KOH | 3.5 | 1.05 | 50 | 20 | 1.7 | 10.6 | 88 |
| 7 | KOH | 3.5 | 1.05 | 50 | 4 | 2.2 | 11.3 | 96 |
| 7 | NaOH | 2 | 0.96 | 50 | 1.5 | 1.8 | 10.8 | 91 |
| 7 | NaOH | 2.5 | 1.2 | 40 | 0.5 | 2.1 | 10.8 | 91 |
| 7 | NaOH | 2.5 | 1.2 | 30 | 0.5 | 1.7 | 11.0 | 93 |
| 7 | NaOH | 2.5 | 1.2 | 20 | 0.5 | 1.6 | 11.1 | 94 |

In another experiment 1.7 grams crude 2-methyladenine was treated at reflux temperature with 25 milliliters benzyl alcohol and 1.7 grams sodium hydroxide. Removal of excess benzyl alcohol followed by neutralization resulted in the precipitation of 0.5 gram of $N^6$-benzyl-2-methyladenine, M.P. 280–283° which upon purification yielded $N^6$-benzyl-2-methyladenine in the form of tan platelets, M.P., 285–286°. Calculated: C, 65.3%; H, 5.5%; N, 29.3%. Found: C, 64.7%; H, 5.6%; N, 29.2%.

$N^6$-(o-methylbenzyl)adenine was prepared in a similar manner by reaction of 10 grams of o-methylbenzyl alcohol with 3.0 grams of adenine in the presence of 1.1 gram of sodium hydroxide. The product was in the form of fine, nearly colorless needles, melting at 243.5–244° C., Yield: 4.9 grams. It was analyzed as the hydrochloride.

*Analysis.*—Calculated: N, 25.4%; Cl, 13.2%. Found: N, 25.4%; Cl, 12.9%.

In a similar manner, $N^6$-(p-methylbenzyl)adenine was prepared by substituting 10 grams of p-methylbenzl alcohol for the o-methylbenzyl alcohol.

4.2 grams of product, melting point 266.5–267.5° C. were obtained.

*Analysis.*—Calculated: C, 65.3%; N, 29.3%. Found: C, 65.7%; N, 29.3%.

The compounds prepared in accordance with the process of the present invention are of interest for a variety of purposes. Thus, many of the adenine compounds prepared by the process of this invention also are of known value as inhibitors of microorganisms of various types, while some of these, and others, are of interest as intermediates in the preparation of pharmaceuticals, such as phosphatides, enzyme precursors, and the like. Further, many if not all of these adenines affect the physiology of plants and plant materials. Many are of particular value for use for inhibiting deterioration of harvested leafy plant materials, such as lettuce, chicory, spinach, and the like. When applied as very dilute aqueous solutions—concentrations of the order of from about 0.5 to about 5 or 10 parts per million by weight of the water—to the surfaces of the plant materials, these compounds markedly inhibit wilting, decoloration and loss of edibility of those materials.

I claim as my invention:

1. A process comprising heating together at a temperature above about 150° C. (a) a salt of an adenine compound of the group consisting of compounds of the formula

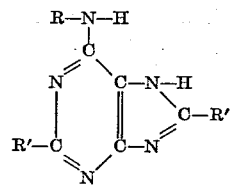

and the compounds of the formula

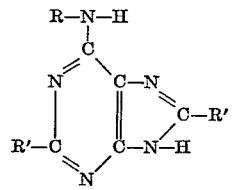

wherein R represents a member of the group consisting of hydrogen, and organic radicals of up to 10 carbon atoms of the group consisting of unsubstituted alkyl, alkenyl and alkadienyl radicals and such radicals substituted by from one to a plurality of substituents of the group consisting of halogen, nitro, alkoxy, alkylthio and hydroxy, and R' represents a member of the group consisting of hydrogen and organic radicals of up to 10 carbon atoms of the group consisting of the radicals represented by R, the cyclohexyl, phenyl and alkyl-substituted phenyl radicals and such radicals substituted by from one to a plurality of substituents of the group consisting of halogen, nitro, alkoxy, alkylthio, hydroxy and cyano, the hydroxy, mercapto, furfuryl and pyranyl radicals, and (b) an alcohol containing up to 10 carbon atoms and selected from the group consisting of unsubstituted alkanols, unsubstituted aralkyl alcohols, phenol, anthrol and naphthol, and such alcohols substituted by from one to a plurality of substituents of the group consisting of hydroxy, alkoxy, halogen, amino, monoalkylamino, dialkylamino and nitro, in the presence of a catalytic amount of a strong base having an ionization constant of nearly unity, whereby there is formed the derivative of said adenine compound having bonded to the exocyclic nitrogen atom thereof the portion of said alcohol.

2. A process according to claim 1 wherein the adenine compound is the salt of the strong base employed as catalyst.

3. A process comprising heating together at a temperature above about 150° C. a salt of adenine and an aralkyl primary alcohol of up to ten carbon atoms, in the presence of a catalytic amount of a strong base having an ionization constant of nearly unity, whereby there is formed the adenine having bonded to the exocyclic nitrogen atom thereof the organic portion of said aralkyl alcohol.

4. A process according to claim 3 wherein the alcohol is benzyl alcohol.

5. A process for the preparation of $N^6$-benzyladenine, which comprises heating together at a temperature above about 150° C. a salt of adenine and benzyl alcohol, in the presence of a catalytic amount of an alkali metal hydroxide, said salt of adenine being formed in situ by reaction with said alkali metal hydroxide, whereby there is formed $N^6$-benzyladenine.

References Cited in the file of this patent

UNITED STATES PATENTS

| | | |
|---|---|---|
| 2,377,233 | Hill et al. | May 29, 1945 |
| 2,580,284 | Deahl et al. | Dec. 25, 1951 |
| 2,764,591 | Sprinzak | Sept. 25, 1956 |